T. C. BEAN.
ATTACHMENT FOR AUTOMOBILES.
APPLICATION FILED OCT. 8, 1912.
1,077,030.  Patented Oct. 28, 1913.
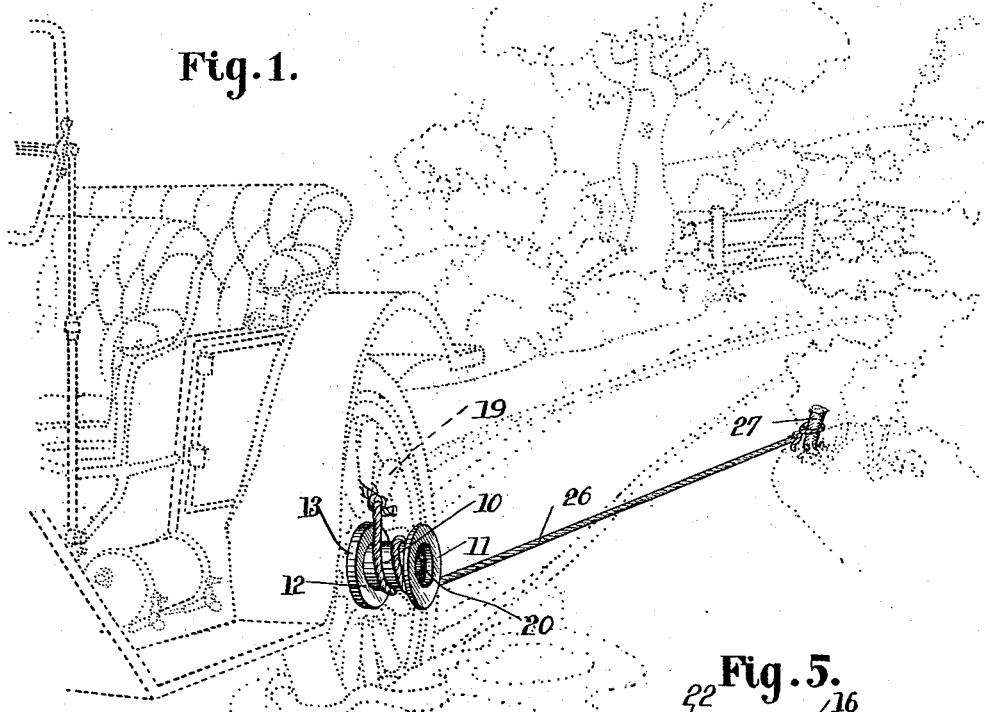
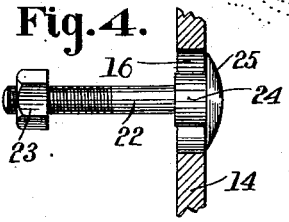
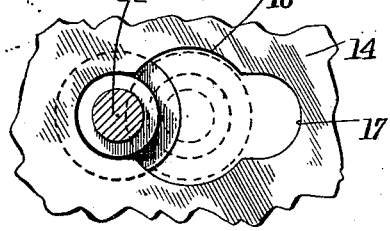
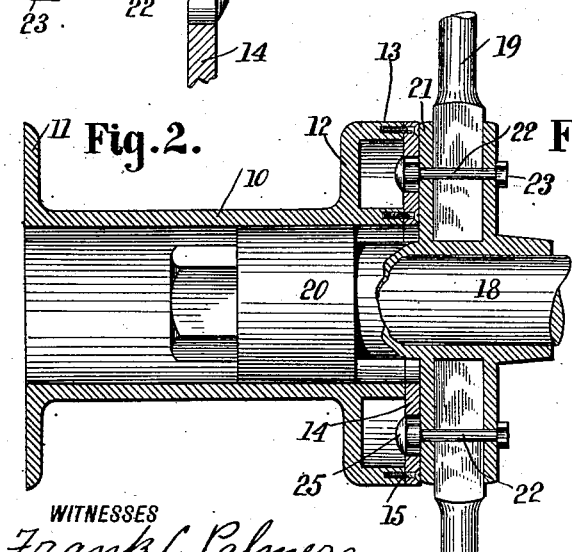
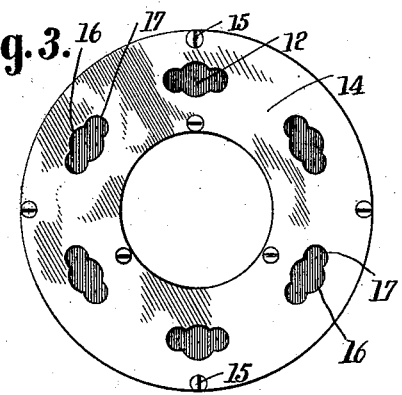
WITNESSES
Frank C. Palmer
John K. Bachwald
INVENTOR
Theodore C. Bean,
BY Munn & Co.
ATTORNEYS
COLUMBIA PLANOGRAPH CO., WASHINGTON, D. C.

UNITED STATES PATENT OFFICE.

THEODORE CLYDE BEAN, OF GLEN ULLIN, NORTH DAKOTA.

ATTACHMENT FOR AUTOMOBILES.

1,077,030.  Specification of Letters Patent.  Patented Oct. 28, 1913.

Application filed October 8, 1912. Serial No. 724,514.

*To all whom it may concern:*

Be it known that I, THEODORE C. BEAN, a citizen of the United States, and a resident of Glen Ullin, in the county of Morton and State of North Dakota, have invented certain new and useful Improvements in Attachments for Automobiles, of which the following is a full, clear, and exact description.

This invention relates to attachments for automobiles and the like, and has reference more particularly to a device of this kind which comprises a drum, and means for attaching the same to one of the driving wheels of the vehicle, the attaching means serving to hold the drum against displacement by a turning movement in either direction, but permitting the removal of the drum by a movement in the direction of the axis of the drum.

The object of the invention is to provide a simple, strong and inexpensive attachment for automobiles, by means of which the vehicles can be drawn out of mud holes, sand pits and the like by their own power, to permit the vehicle to advance when the driving wheels are unable to make a tractive effort, which can be readily, and in fact almost instantly attached to and detached from a driving wheel, which is compact in form and light in weight, which necessitates practically no structural alteration in the driving wheels, and which obviates the necessity of utilizing draft animals or another motor vehicle when the first vehicle is stalled owing to the failure of traction.

The invention consists in the construction and combination of parts to be more fully described hereinafter and particularly set forth in the claims.

Reference is to be had to the accompanying drawings, forming a part of this specification, in which similar characters of reference indicate corresponding parts in all the views, and in which—

Figure 1 is a perspective view showing an embodiment of my invention applied to a motor vehicle, the view being shown in broken outline; Fig. 2 is an enlarged longitudinal section of a part of a driving wheel having the attachment applied thereto; Fig. 3 is a rear elevation of the drum; Fig. 4 is an enlarged fragmentary section showing part of the drum, and the means for attaching the same to the driving wheel; and Fig. 5 is an enlarged fragmentary elevation partly in section, showing the attaching means.

Before proceeding to a more detailed explanation of my invention it should be clearly understood that the device can be advantageously applied to all types of automobiles or motor vehicles having driving wheels. The device can be fashioned from any suitable material, preferably from cast metal or the like, and includes a drum having means for removably attaching it to a driving wheel to convert the driving wheel itself into a drum upon which a line can be wound up when the driving wheel is actuated, the free end of the line being fixed to a suitable support, to drag the vehicle from one point to another when it is stalled. If so desired, two of these drums can be applied, one to each of the driving wheels of the vehicle. In this case, two lines are used, both of which are attached to the support, which may consist of a convenient tree, fence post or the like. I am aware that it has hitherto been proposed to utilize a detachable drum in this manner. My invention, as will be pointed out hereinafter, resides primarily in the manner of attaching the drum and the means provided for the purpose.

Certain of the details of construction shown for example herewith, form no part of the invention, and can be varied in accordance with individual preference and special conditions, without departing from the underlying spirit of the invention.

Referring more particularly to the drawings, I provide a hollow, substantially cylindrical drum 10 having at the outer end a radially extending flange 11, and near the inner end, but spaced inwardly therefrom, a radially extended flange 12 having an axially disposed periphery 13, the edge of which terminates flush with the inner edge of the drum itself. An end plate 14 is mounted at the inner extremity of the drum and rests against the edges of the drum and of the periphery 13, being secured thereto by means of screws 15 or in any other suitable manner. The end plate has a plurality of circularly disposed, preferably equi-distant openings, each consisting of a central enlargement 16 and end portions 17. The central enlargement and the end portions are of circular curvature, but the diameter of the central enlargement exceeds materially the diameters of the end portions 17.

The vehicle driving axle 18 has mounted thereon driving wheels 19 provided with hubs 20 of the usual construction. The drum is so proportioned that it can be fitted against the wheel with the hub thereof entering the drum, as is clearly shown in Fig. 2, so that the end plate 14 of the drum rests against one of the hub plates 21. I provide a number of attaching bolts 22, one for each of the openings in the end plate of the drum. The bolts have retaining nuts 23 and pass through suitable openings provided for the purpose in the hub and the wheel. Each bolt has at the end remote from the nut a circular reinforcement 24 beyond which is a head 25 of conventional, rounded form.

The parts 24 and 25 of the bolts are so proportioned that the heads 25 can pass through the central enlargements 16 of the end plate openings, but cannot pass through the end portions 17 of these openings, into which, however, the reinforcements 24 of the bolts will fit. The bolts are spaced equidistant, and correspond in position to the openings. To attach a drum to a driving wheel it is placed in juxtaposition therewith, the hub entering the drum, and each of the bolt heads passing through a central enlargement 16 of the openings of the end plates. The drum is then turned in one direction or the other, to bring the reinforcements 24 of the bolts into one or the other of the end portions of the openings, whereupon the drum will be held against displacement in its axial direction, owing to the fact that the heads 25 engage around the end portions of the openings and securely hold the drum in place. It will be noticed that the drum is turned in one direction or the other according as the wheel is to be driven ahead or reversed in winding the cord 26 up upon the drum. The cord has its free end attached to a support such as a stake or post 27, the other end being attached to the vehicle wheel 19. It will be understood that the drum can also be locked in position upon the wheel by turning the wheel in one direction or the other and holding the drum fast.

If so desired, the bolts 22 can be dispensed with and the hub of the wheel otherwise provided with studs or projections having heads and reinforcements corresponding to the parts 24 and 25 and for the same purpose. It might be found of advantage to fashion one of the hub plates 21 with integral lugs or projections of this character and of course capable of a function similar to that of the bolts 22.

Having thus described my invention I claim as new, and desire to secure by Letters Patent:—

1. A device of the class described comprising, a drum having means adapted to engage the hub of a vehicle wheel, said drum having an inclosure formed at the end to be secured to the wheel, said end having a plurality of openings each having a central enlargement and end portions; and a plurality of locking members on the wheel each having a reinforcement projecting from the wheel and a head on said reinforcement, said members being so proportioned that said heads thereof pass through said central enlargement of said openings into said inclosure and the enlargement adjacent said heads fit into said end portions of said openings in said end of said drum.

2. A device of the class described comprising, a drum having means adapted to engage the hub of a vehicle wheel, said drum having an inclosure formed at the end adjacent the wheel, said inclosure being formed of an enlarged portion of the drum having a circular recess and a plate closing said circular recess, said plate having a plurality of openings each having a central enlargement and end portions; and a plurality of locking members on the wheel each having a reinforcement projecting from the wheel and a head on said reinforcement, said members being so proportioned that the heads thereof pass through said central enlargement of said openings in said plate into said circular recess and that the reinforcement adjacent said head fits into said end portions in said plate.

In witness whereof I have signed my name to this specification in the presence of two subscribing witnesses.

THEODORE CLYDE BEAN.

Witnesses:
  D. P. BARNES,
  H. L. FINCK.

---

Copies of this patent may be obtained for five cents each, by addressing the "Commissioner of Patents, Washington, D. C."